United States Patent
Mathew et al.

(10) Patent No.: US 8,238,682 B2
(45) Date of Patent: Aug. 7, 2012

(54) PARALLEL PROCESSING FOR GENERATING A THINNED IMAGE

(75) Inventors: Manoj Mathew, Tustin, CA (US); Keiichi Sakai, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 896 days.

(21) Appl. No.: 12/342,624

(22) Filed: Dec. 23, 2008

(65) Prior Publication Data

US 2010/0158390 A1 Jun. 24, 2010

(51) Int. Cl.
*G06K 9/42* (2006.01)
*G06K 15/00* (2006.01)

(52) U.S. Cl. .......... 382/259; 382/299; 358/3.07

(58) Field of Classification Search .......... 382/259, 382/299; 358/3.01
See application file for complete search history.

(56) References Cited

U.S. PATENT DOCUMENTS

| | | | | |
|---|---|---|---|---|
| 4,539,704 A | * | 9/1985 | Pastor | 382/258 |
| 4,574,357 A | * | 3/1986 | Pastor et al. | 382/258 |
| 4,665,441 A | | 5/1987 | Sakaue et al. | |
| 4,703,363 A | * | 10/1987 | Kitamura | 358/448 |
| 5,224,179 A | * | 6/1993 | Denker et al. | 382/259 |
| 5,384,866 A | * | 1/1995 | Kumagai | 382/259 |
| 5,438,682 A | | 8/1995 | Kumagai | |
| 5,621,823 A | * | 4/1997 | Kumagai | 382/259 |
| 6,707,953 B1 | | 3/2004 | Iida | |
| 7,336,396 B2 | | 2/2008 | Takano et al. | |
| 7,408,672 B2 | | 8/2008 | Ito | |
| 7,590,277 B2 | * | 9/2009 | Oaki et al. | 382/141 |
| 2001/0036300 A1 | | 11/2001 | Xia et al. | |
| 2006/0153449 A1 | | 7/2006 | Park et al. | |

FOREIGN PATENT DOCUMENTS

EP 1176544 A1 1/2002

OTHER PUBLICATIONS

H.E. Lu, et al., "A Comment on 'A Fast Parallel Algorithm for Thinning Digital Patterns'", Communications of the ACM, Mar. 1986, vol. 29, No. 3, pp. 239-242.
T.Y. Zhang, et al., "A Fast Parallel Algorithm for Thinning Digital Patterns", Communications of the ACM, Mar. 1984, vol. 27, No. 3, pp. 236-239.
Christopher M. Holt, et al., "An Improved Parallel Thinning Algorithm", Communications of the ACM, Feb. 1987, vol. 30, No. 2, pp. 156-160. Christian Neusius, et al., "A Noniterative Thinning Algorithm", ACM Transactions on Mathematical Software, Mar. 1994, vol. 20, No. 1, pp. 5-20.
Jean-Luc Levaire, et al., "A multiscale parallel thinning algorithm", Lecture Notes in Computer Science, 1992, vol. 634, pp. 595-600.
Ching Y. Suen, et al., eds., "Thinning Methodologies for Pattern Recognition", published by World Scientific, 1994.

\* cited by examiner

*Primary Examiner* — Jason M Repko
*Assistant Examiner* — Patrick Edwards
(74) *Attorney, Agent, or Firm* — Fitzpatrick, Cella, Harper & Scinto

(57) ABSTRACT

A thinned output image is generated from an input image. Values of pixels surrounding a pixel of interest in the input image are determined, and first and second neighboring pixel patterns surrounding the pixel of interest are established based on the values of the pixels surrounding the pixel of interest. The first neighboring pixel pattern may be compared to each of a set of purge patterns to determine whether to eliminate the pixel, and the second neighboring pixel pattern may be compared to each of a set of conservation patterns to determine whether to conserve the pixel. The comparisons to the purge and conservation patterns are performed for each pixel independently, and in parallel for all pixels of the input image.

22 Claims, 12 Drawing Sheets

| P15 | P14 | P13 | P12 | P11 |
|-----|-----|-----|-----|-----|
| P16 | P4  | P3  | P2  | P10 |
| P17 | P5  | P0  | P1  | P9  |
| P18 | P6  | P7  | P8  | P24 |
| P19 | P20 | P21 | P22 | P23 |

FIG. 5

| FIG. 5A |
|---|
| FIG. 5B |

FIG. 5A

Purge Kernels (3x3)

FIG. 5B

| P15 | P14 | P13 | P12 | P11 |
|-----|-----|-----|-----|-----|
| P16 | 8 | 4 | 2 | P10 |
| P17 | 10 | 0 | 1 | P9 |
| P18 | 20 | 40 | 80 | P24 |
| P19 | P20 | P21 | P22 | P23 |

Sample Image #2 - (10 x 6) - Input

| 0 | 0 | 0 | 0 | 0 | 1 | 1 | 0 | 0 | 0 | 0 | 0 |
|---|---|---|---|---|---|---|---|---|---|---|---|
| 0 | 0 | 0 | 0 | 0 | 1 | 1 | 0 | 0 | 0 | 0 | 0 |
| 0 | 0 | 0 | 0 | 0 | 1 | 1 | 0 | 0 | 0 | 0 | 0 |
| 0 | 0 | 1 | 1 | 1 | 1 | 1 | 1 | 1 | 1 | 1 | 1 |
| 0 | 0 | 1 | 1 | 1 | 1 | 1 | 1 | 1 | 1 | 1 | 1 |
| 0 | 0 | 0 | 0 | 0 | 1 | 1 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

FIG. 12A

Sample Image # 2 - Output

| 0 | 0 | 0 | 0 | 0 | 1 | 0 | 0 | 0 | 0 |
|---|---|---|---|---|---|---|---|---|---|
| 0 | 0 | 0 | 0 | 0 | 1 | 0 | 0 | 0 | 0 |
| 0 | 0 | 0 | 0 | 0 | 1 | 0 | 0 | 0 | 0 |
| 0 | 0 | 1 | 1 | 1 | 1 | 1 | 1 | 1 | 1 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 12B

Sample Image #3 - (9 x 5) - Input

FIG. 13A

Sample Image #3 - (9 x 5) - output

FIG. 13B

PARALLEL PROCESSING FOR GENERATING A THINNED IMAGE

FIELD

The present disclosure generally relates to image processing, and more particularly relates to processing input images to generate a thinned output image. In more detail, the disclosure relates to comparing pixels surrounding a pixel of interest to predetermined patterns in order to determine whether to eliminate the pixel of interest, and performing these comparisons in parallel for all pixels.

BACKGROUND

In image processing, it is common to perform a thinning process on a digital image. Thinning, or "skeletonization", thins an input image into output branches of single pixel thickness. A thinning output should attempt to retain the connectedness and structure of the input image. Thinning is useful for identifying key pixels in fields such as medical imaging, fingerprinting technology, character recognition, airport security, logic/electrical circuit analysis, and soil and metallurgy crack analysis.

Some thinning procedures operate by eroding outer contours of the input image. There are also a number of iterative procedures which process pixels sequentially. There also exist procedures based on partitioning the input image prior to thinning. Using one of these procedures, it is ordinarily possible to generate a thinned output image.

However, the above thinning procedures have significant disadvantages. For example, procedures which perform thinning by eroding outer contours can result in a loss of critical patterns and structures. Iterative procedures may get closer to producing the required output, but tend to be very slow and computationally expensive, and thus are infeasible for many operations. Partitioning procedures require significant pre-processing before the thinning process is applied, and may also require significant post-processing to merge the partitions back together.

SUMMARY

The present disclosure addresses the foregoing by comparing pixels surrounding a pixel of interest to predetermined patterns in order to determine whether to eliminate the pixel of interest, and performing these comparisons in parallel for all pixels.

Thus, in an example embodiment described herein, a thinned output image is generated from an input image. Values of pixels surrounding a pixel of interest in the input image are determined, and first and second neighboring pixel patterns surrounding the pixel of interest are established based on the values of the pixels surrounding the pixel of interest. The first neighboring pixel pattern is compared to each of a set of purge patterns comprising predefined arrangements of pixel values, and if the first neighboring pixel pattern matches one of the purge patterns, the pixel of interest is flagged for elimination. In the case that the pixel is flagged for elimination, the second neighboring pixel pattern is compared to each of a set of conservation patterns comprising predefined arrangements of pixel values. If the second neighboring pixel pattern matches one of the conservation patterns, the pixel of interest is unflagged, and is thereby saved from elimination. The pixel of interest is eliminated if the pixel of interest is still flagged for elimination after comparison to the conservation patterns. The comparisons to the purge and conservation patterns are performed for each pixel independently, and in parallel for all pixels of the input image.

Thus, a decision is made whether to keep or discard each pixel by comparing the pixel's neighbors to predefined purge and conservation patterns. The purge and conservation patterns are predetermined, and are based on analysis of which patterns of neighboring pixels allow for a pixel of interest to be eliminated, while nonetheless conserving those pixels which are critical to the connectedness and structure of the input image.

According to another example embodiment described herein, a thinned output image is generated from an input image. Values of pixels surrounding a pixel of interest in the input image are determined, and first and second neighboring pixel patterns surrounding the pixel of interest are established based on the values of the pixels surrounding the pixel of interest. The second neighboring pixel pattern is compared to each of a set of conservation patterns comprising predefined arrangements of pixel values. If the second neighboring pixel pattern does not match any of the conservation patterns, the first neighboring pixel pattern is compared to each of a set of purge patterns comprising predefined arrangements of pixel values. The pixel of interest is eliminated if the first neighboring pixel pattern matches any of the purge patterns. The comparisons to the conservation patterns and to the purge patterns are performed for each pixel independently, and in parallel for all pixels of the input image.

By performing comparisons for all of the pixels of the input image in parallel, many of the disadvantages of current thinning procedures can be reduced. In particular, since the outcome for each pixel is not dependent on the outcome of other pixels, the resultant thinned image can ordinarily be produced much more quickly than in iterative procedures. In addition, the need for pre- or post-processing of the image data is reduced, while critical structures and connectivity of the image are ordinarily preserved.

This brief summary has been provided so that the nature of this disclosure may be understood quickly. A more complete understanding can be obtained by reference to the following detailed description and to the attached drawings.

BRIEF DESCRIPTION OF THE DRAWINGS

FIGS. 5A and 5B illustrate an example set of purge patterns.

FIGS. 12A and 12B illustrate another example image before and after the thinning process.

FIGS. 13A and 13B illustrate another example image before and after the thinning process.

DETAILED DESCRIPTION

Figure 1:
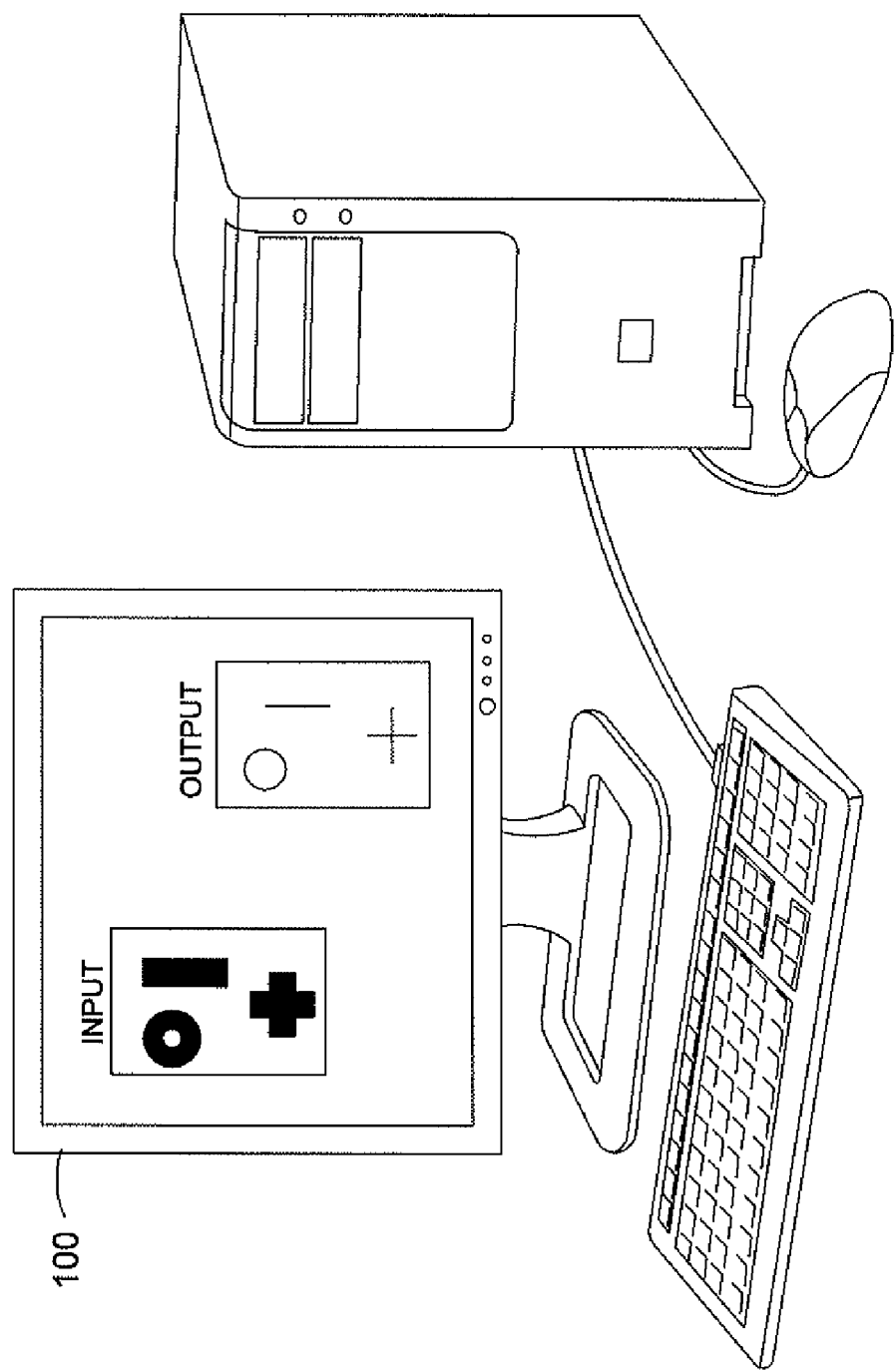
FIG. 1 illustrates an example embodiment of computing equipment in which aspects of the present disclosure may be practiced.

FIG. 1 illustrates an example embodiment of computing equipment in which aspects of the present disclosure may be practiced. As shown in FIG. 1, computer 100 displays an input image on the left side of a screen, and a thinned output image on the right side of the screen.

While FIG. 1 depicts a computer, the computing equipment for practicing the aspects of the present disclosure can be implemented in a variety of embodiments. For example, in a medical imaging environment, the computing equipment might be included as part of a larger imaging machine such as a CT or ultrasound scanner. For character recognition applications, the computing equipment might be included in a multipurpose printer or copier including a scanner. The computing equipment might also be included in specialized equipment such as a digital fingerprint scanner, airport security equipment, or a handheld x-ray scanner. Other embodiments are possible according to the application and environment.

Figure 2:
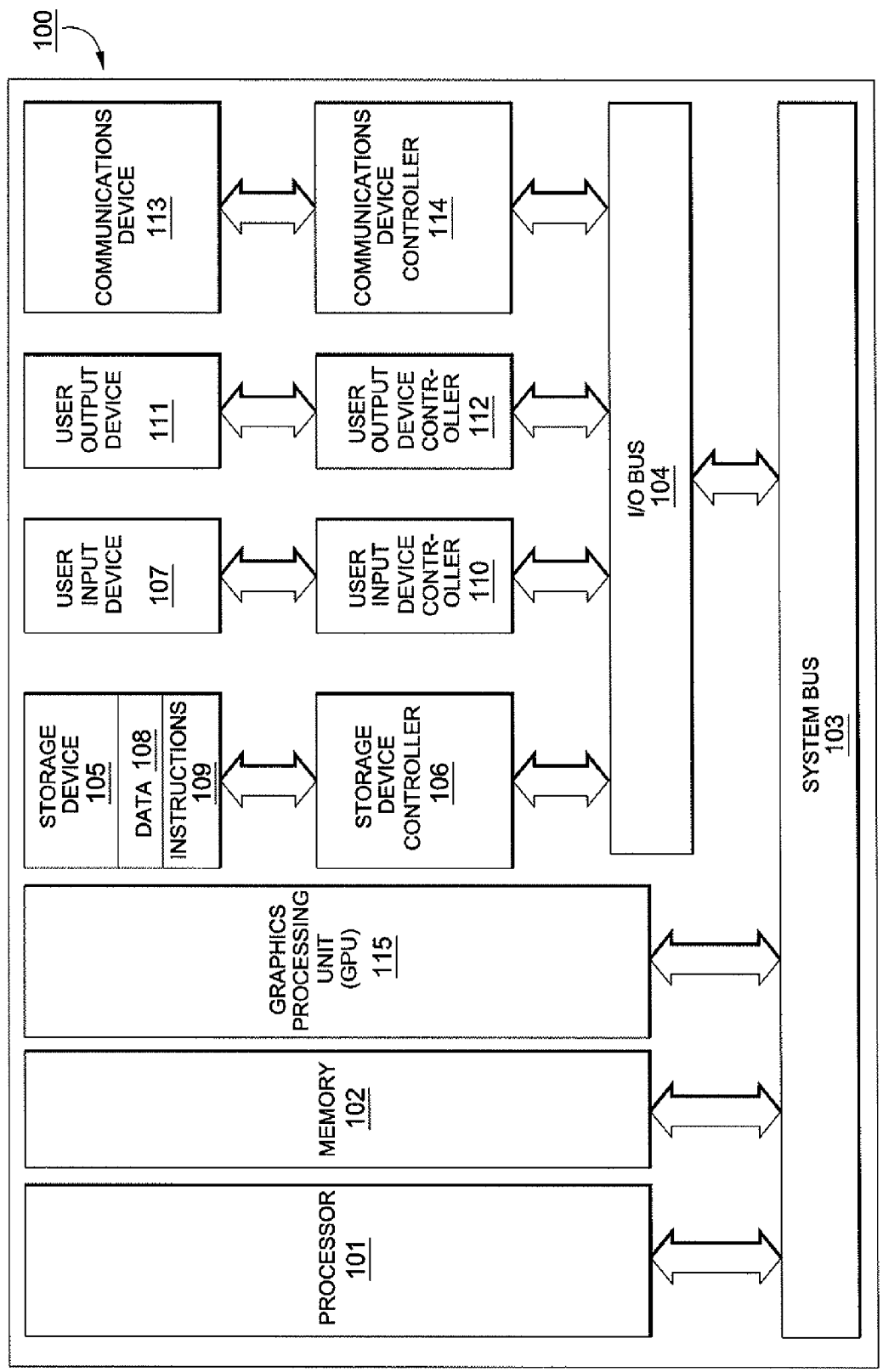
FIG. 2 is a block diagram depicting the architecture of the computing equipment shown in FIG. 1.

FIG. 2 is a block diagram of the architecture of computer 100. The elements of computer 100 may be implemented using hardcoded computational modules or other types of circuitry, or a combination of software and circuitry. Host computer 100 includes a processor 101 coupled to a memory 102 via system bus 103. Memory 102 can include, for example, a RAM, SDRAM, DDR SRAM, or flash memory. In operation, processor 101 loads program instructions from storage device 105 into memory 102. Processor 101 executes the loaded program instructions to implement a process for thinning an input image into an output image of single pixel thickness, as described in more detail below. For purposes of this disclosure, an input image can be an image loaded from memory 102 or another storage device.

Processor 101 is also coupled to external Input/Output (I/O) devices via the system bus 103 and an I/O bus 104. More specifically, the processor may be coupled to a user output device 111 via a user output device controller 112 coupled to the I/O bus 104.

Output device 111 can include hardware such as a display monitor or a screen. Output device 111 may display an input image along with a thinned output image. Alternatively, output device 111 may display only one of the input image and the thinned output image at a time. Output device controller 112 could be, for example, a separate video card or graphics controller. The processor 101 may be further coupled to a user input device 107 via a user input device controller 110 coupled to the I/O bus 104. Input devices can include hardware such as, for example, a keyboard, a mouse, a joystick, a trackball or a game controller, which allow a user of host computer 100 to input commands. In this embodiment, input device 107 could also include a scanner for inputting images to be thinned by a thinning process.

A storage device 105 having computer-readable media is coupled to the processor 101 via a storage device controller 106, the I/O bus 104 and the system bus 103. For example, storage device 105 could include a hard disk drive. In one implementation, storage device 105 is used by processor 101 to store and read data 108 and program instructions 109 to be loaded into memory 102 in order to execute a process for thinning an input image, as described in more detail below.

The processor 101 is further coupled to a communications device 113 via a communications device controller 114 coupled to the I/O bus 104. The processor uses the communications device 113 to communicate with another device.

More specifically, communication device 113 allows computer 100 to receive images over a network. Communications device 113 may be a network interface card (NIC). Thus, in one example, computer 100 obtains an image to be thinned from another device over a network.

Graphics Processing Unit (GPU) 115 is coupled to processor 101, memory 102, and I/O bus 104 via system bus 103. GPU 115 is a dedicated graphics rendering device. GPU 115 may be particularly well suited for parallel processing, especially in an image processing environment. GPU 115 may also control its own separate partition of memory 102 for processing image data. GPU 115 may operate in coordination with processor 101 to execute program instructions to implement a process for thinning an input image into an output image of single pixel thickness, or may perform these functions on its own. For purposes of simplicity, GPU 115 is shown as a separate unit in FIG. 2. However, several other embodiments of GPU 115 are possible. For example, processor 101 may include or itself comprise GPU 115. GPU 115 could also sit on top of a video card, or could be integrated directly into the motherboard. GPU 115 could also be integrated in, for example, user output device controller 112.

During a thinning process, computer 100 transforms an input image into an output image of single pixel thickness. As discussed above, however, conventional methods for thinning an image can be slow and computationally expensive, and can result in a loss of critical structures or pixels. In addition, the speed and or processing required for conventional procedures may simply be unacceptable in real-time applications, such as airport security.

A process for thinning an input image will now be described with respect to FIGS. 3 to 13.

Figures 3, 4:
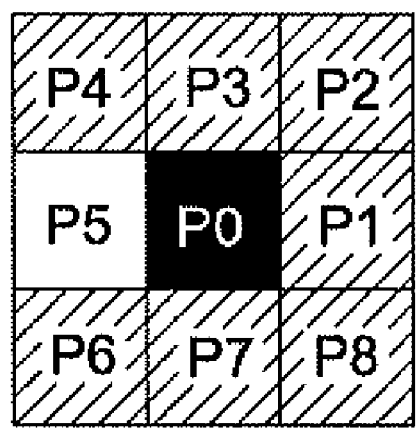
FIG. 3 illustrates an example of a pixel of interest and its neighboring pixels.
FIG. 4 illustrates an example of a pattern of pixel values immediately surrounding a pixel of interest.

FIG. 3 depicts an example of a pixel of interest and its neighboring pixels. As shown in FIG. 3, pixel P0 is the center pixel. The center pixel is also the pixel of interest. In this regard, since the thinning process is executed in parallel for all pixels, each pixel in the input image is treated as a pixel of interest P0 at the same time. Pixel positions P1 to P8 form a 3×3 grid with P0, and can be considered the immediate neighbors of pixel P0. On the other hand, pixels at positions P1 to P24 form a 5×5 grid with P0, and correspond to the extended neighbors of pixel P0. The neighboring pixels are compared to predefined patterns in order to determine whether to keep the pixel of interest, in a process that will be described in more detail below.

FIG. 4 illustrates an example of data values for the pixel of interest and its immediate neighbors. In the example of FIG. 4, pixels P1 to P4 and pixels P6 to P8 have a value of "1". During the thinning process, the value of pixel of interest P0 is irrelevant; only the values of neighboring pixels are compared to the purge and/or conservation patterns.

For purposes of simplicity in the examples herein, a pixel with a value "1" (set bit) is considered to be a black pixel, whereas a pixel with a value "0" (unset) is considered to be a white or background pixel. However, the color or shade of a set or unset bit can vary based on the application. For example, an optical character recognition program might generate a thinned black output image on a white background. On the other hand, in medical imaging, a thinning process might generate a thinned white output image on a black background (e.g., a bone against an x-ray background). The invention could also be applied to color images, as long as the colors can be binarized.

Figures 5, 5A, 5B:
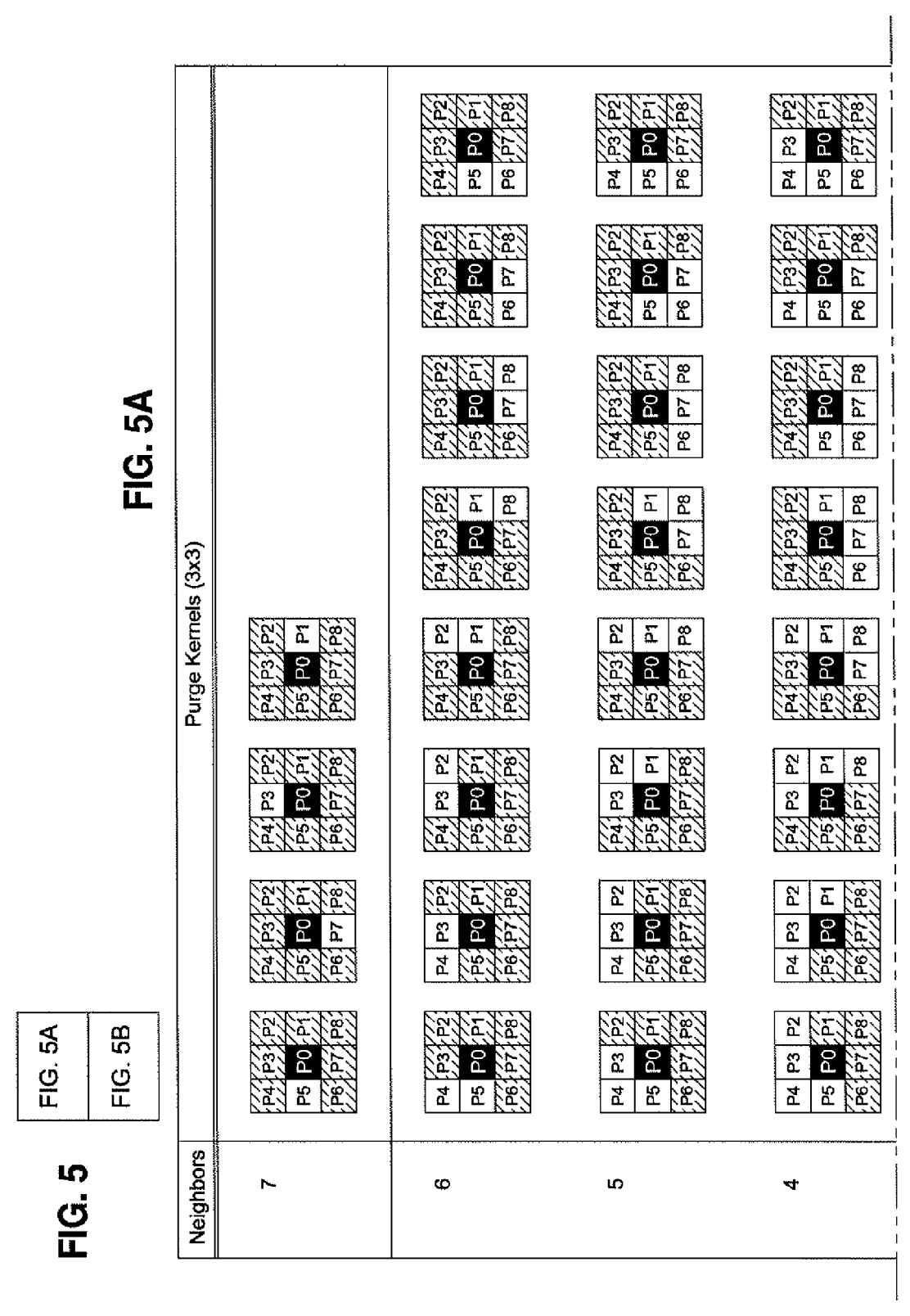
Figure 5B:
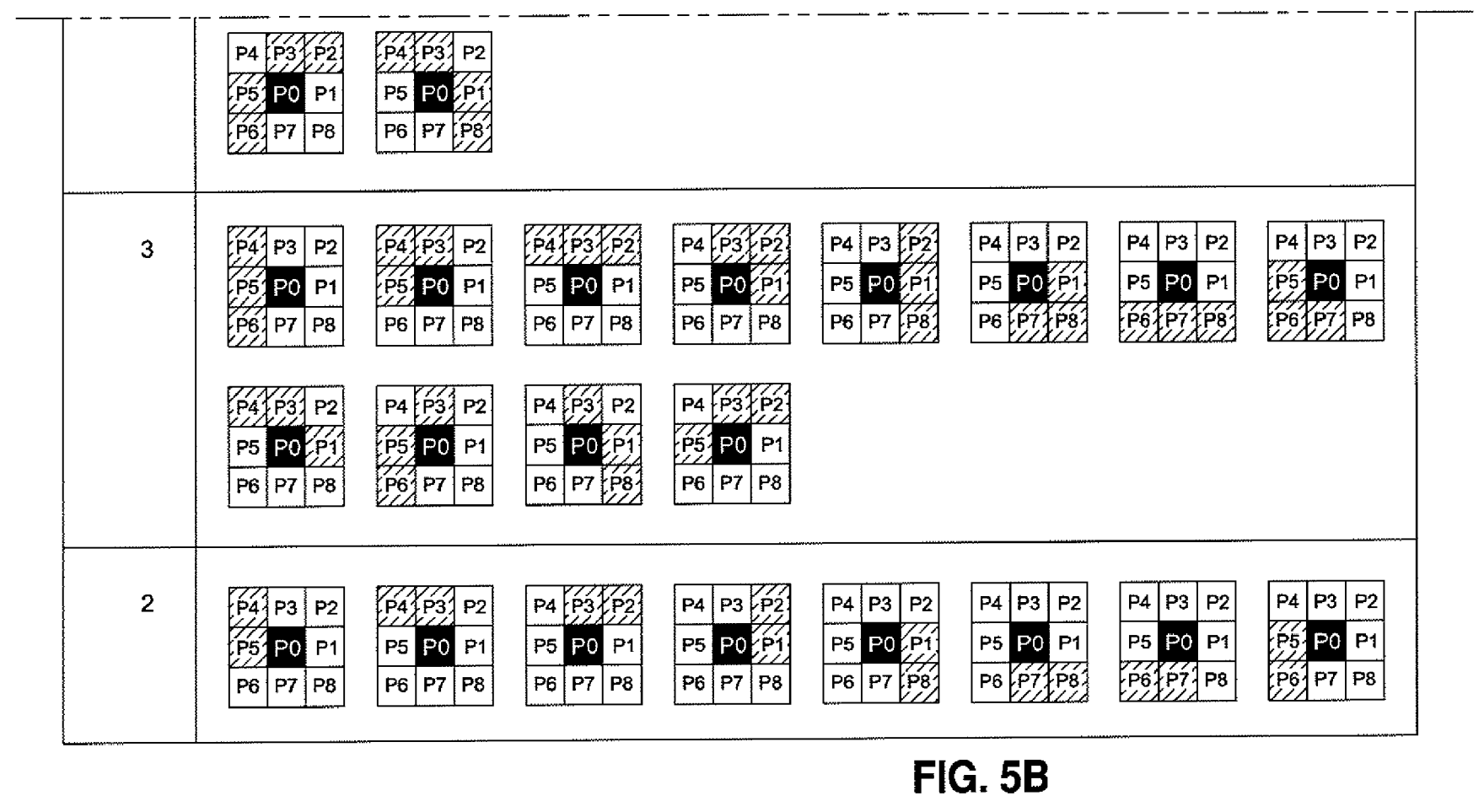

FIG. 5 illustrates an example of a set of purge patterns.

Each purge pattern is a 3×3 grid of pixels with a unique pattern of pixel values, and each purge pattern is compared to the 3×3 grid of pixels formed by the values of pixels P1 to P8.

The set of purge patterns in FIG. 5 are determined prior to the start of the thinning process. More specifically, the patterns of pixel values shown in FIG. 5 have been determined to correspond to situations in which it is preferable to remove the pixel of interest, or at least consider the pixel of interest as a candidate for removal. Thus, if the values of pixels surrounding the pixel of interest match one of the purge patterns, the pixel of interest may be flagged as a candidate for removal.

The purge patterns could be changed based on directional priority chosen prior to starting a thinning process. For example, the purge patterns shown in FIG. 5 give higher priority to the right and bottom directions. Thus, referring to the example shown in FIGS. 12A and 12B, this priority yields more output pixels at the right and bottom of the image (if possible). However, the purge patterns could also be constructed to favor the top and left directions, for example.

Figure 6:
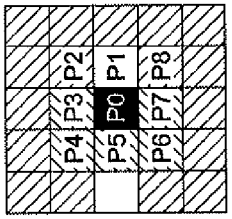
FIG. 6 illustrates an example set of conservation patterns.

FIG. 6 illustrates an example set of conservation patterns. Each conservation pattern is a 5×5 grid of pixels with a unique pattern of pixel values, and each conservation pattern is compared the extended neighbors of the pixel of interest, namely pixels P1 to P24.

Unlike the purge patterns, however, the conservation patterns include irrelevant positions. In other words, the value of pixels at certain positions in the conservation pattern is insignificant to the outcome of the thinning process. Thus, at these positions, it does not matter whether there is a match with the corresponding position of P1 to P24. These positions are shown as "Ignore" positions in FIG. 6.

The set of conservation patterns in FIG. 6 is predetermined. More specifically, these unique patterns of pixel values have been determined to correspond to situations in which it is preferable to conserve the pixel of interest, for purposes of retaining connectivity or otherwise. Thus, if the pattern of pixel values surrounding the pixel of interest matches one of the conservation patterns, the pixel of interest is saved from elimination.

During the thinning process, the conservation patterns have higher priority than the purge patterns. For example, a pixel of interest may be a candidate for removal after comparison to the purge patterns. However, if the extended neighbors of the pixel of interest match a conservation pattern, the pixel is excluded from being a candidate for removal. In another embodiment, the comparison to the conservation patterns is performed first, and if the extended neighbors match one of the conservation patterns, the comparison to the purge patterns can be skipped entirely. Thus, in either case, the conservation patterns override the purge patterns.

Figure 7:
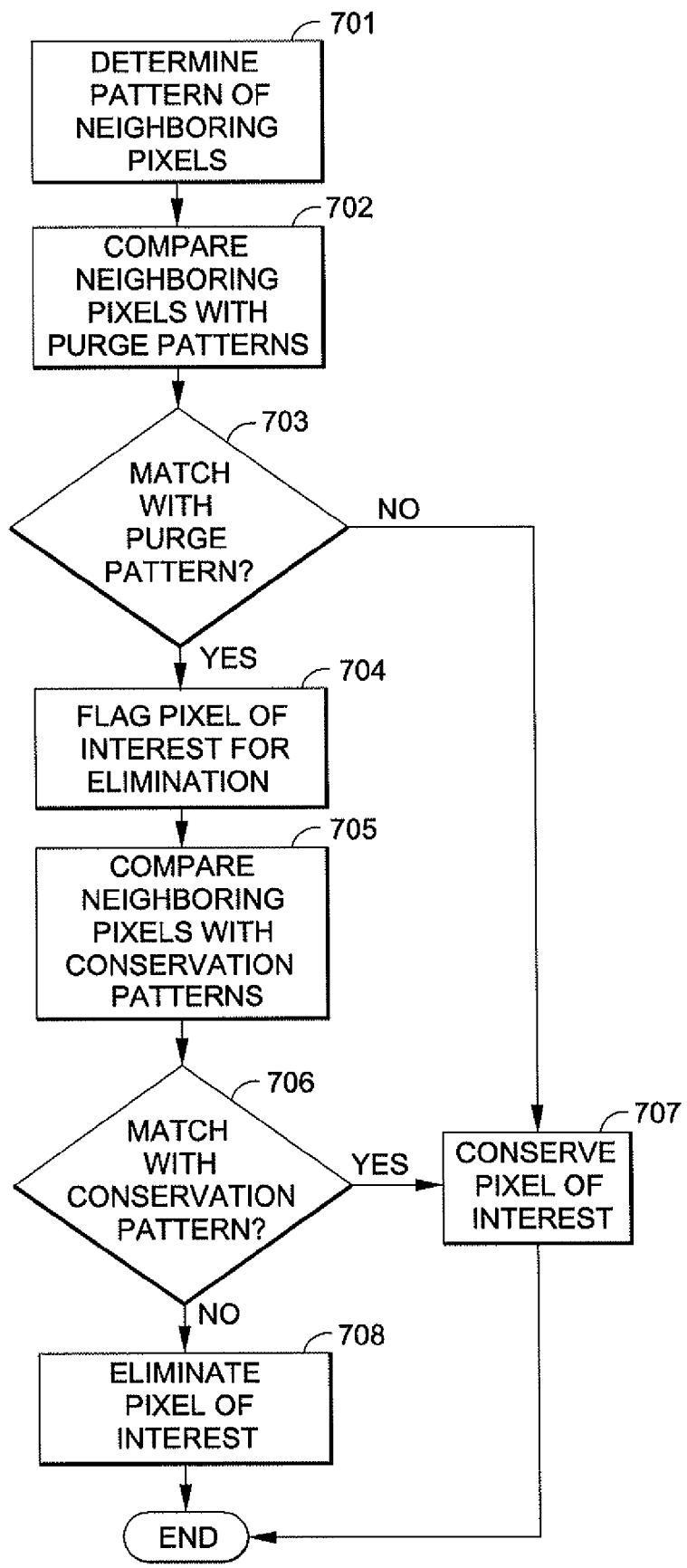
FIG. 7 is a flowchart illustrating an example process for thinning pixels.

FIG. 7 is a flowchart illustrating an example process for thinning pixels according to the disclosure. The process of FIG. 7 is applied to each pixel in the input image independently, and to all pixels in parallel.

Briefly, in FIG. 7, a thinned output image is generated from an input image. Values of pixels surrounding a pixel of interest in the input image are determined, and first and second neighboring pixel patterns surrounding the pixel of interest are established based on the values of the pixels surrounding the pixel of interest. The first neighboring pixel pattern is compared to each of a set of purge patterns comprising predefined arrangements of pixel values, and if the first neighboring pixel pattern matches one of the purge patterns, the pixel of interest is flagged for elimination. In the case that the pixel is flagged for elimination, the second neighboring pixel pattern is compared to each of a set of conservation patterns comprising predefined arrangements of pixel values. If the second neighboring pixel pattern matches one of the conservation patterns, the pixel of interest is unflagged, and is thereby saved from elimination. The pixel of interest is eliminated if the pixel of interest is still flagged for elimination after comparison to the conservation patterns. The comparisons to the purge and conservation patterns are performed for each pixel independently, and in parallel for all pixels of the input image.

In step 701, computer 100 determines a pattern of values of the neighboring pixels surrounding a pixel of interest. Thus, referring to FIG. 3, computer 100 would determine the respective values of pixels P1 to P24.

In step 702, the immediately neighboring pixels P1 to P8 are compared with a set of purge patterns. In this regard, since each purge pattern is only a 3×3 grid, only the immediately neighboring pixels P1 to P8 are compared to the purge patterns. Thus, for example, computer 100 compares the pattern of values of pixels P1 to P8 shown in FIG. 3 to each of the patterns shown in FIG. 5. An example implementation of this comparison will be described in more detail below.

In step 703, computer 100 determines whether the pattern of values for pixels P1 to P8 match any of the purge patterns. If there is no match with any of the purge patterns, there is no need to eliminate the pixel of interest, and the process proceeds to step 707. On the other hand, if there is a match with one of the purge patterns, then the pixel of interest is a candidate for removal. In such a case, the process proceeds to step 704.

In step 704, the pixel of interest is flagged for elimination as a candidate for removal. Here, "flagging" simply refers to marking, storing, or otherwise indicating that the pixel is a candidate for elimination, and is not limited to any particular hardware or software implementation. The process then proceeds to step 705.

In step 705, the extended neighboring pixels P1 to P24 are compared with a set of conservation patterns. More specifically, since each conservation pattern is a 5×5 grid, the values of all of pixels P1 to P24 are compared to each conservation pattern. Thus, for example, computer 100 compares the respective pixel values of extended neighbors P1 to P24 shown in FIG. 3 to each of the set of conservation patterns shown in FIG. 6. An example implementation of this comparison will be described in more detail below.

In step 706, computer 100 determines whether the extended neighbors P1 to P24 match any of the conservation patterns. If there is a match, the process proceeds to step 707. If there is no match with a conservation pattern, the process proceeds to step 708.

In step 707, the pixel of interest P0 is conserved. Thus, if the pixel of interest was previously a candidate for elimination, the pixel of interest is removed from being a candidate for elimination, e.g., by unflagging the pixel of interest as a candidate for elimination. Alternatively, the pixel of interest may have been conserved simply by never having been flagged for elimination in the first place (e.g., "NO" in step 703).

On the other hand, in step 708, if the pixel of interest is a candidate for elimination and has not been conserved (e.g., has not been saved by one of the conservation patterns), the pixel of interest is eliminated. For the purposes of this disclosure, "eliminated" means that the pixel of interest is changed to the color of the background of the output image. Thus, the pixel of interest is effectively eliminated from the thinned output image.

By applying the process of FIG. 7 to all pixels in parallel, it is ordinarily possible to quickly thin an input image while maintaining critical pixels and connectivity, and without requiring any significant pre or post-processing, The comparisons between the neighboring pixels and the purge and conservation patterns are not limited to any particular order. In fact, by changing the order of comparisons, it might be possible to even further reduce the required processing, as described below with respect to FIG. 8.

Figure 8:
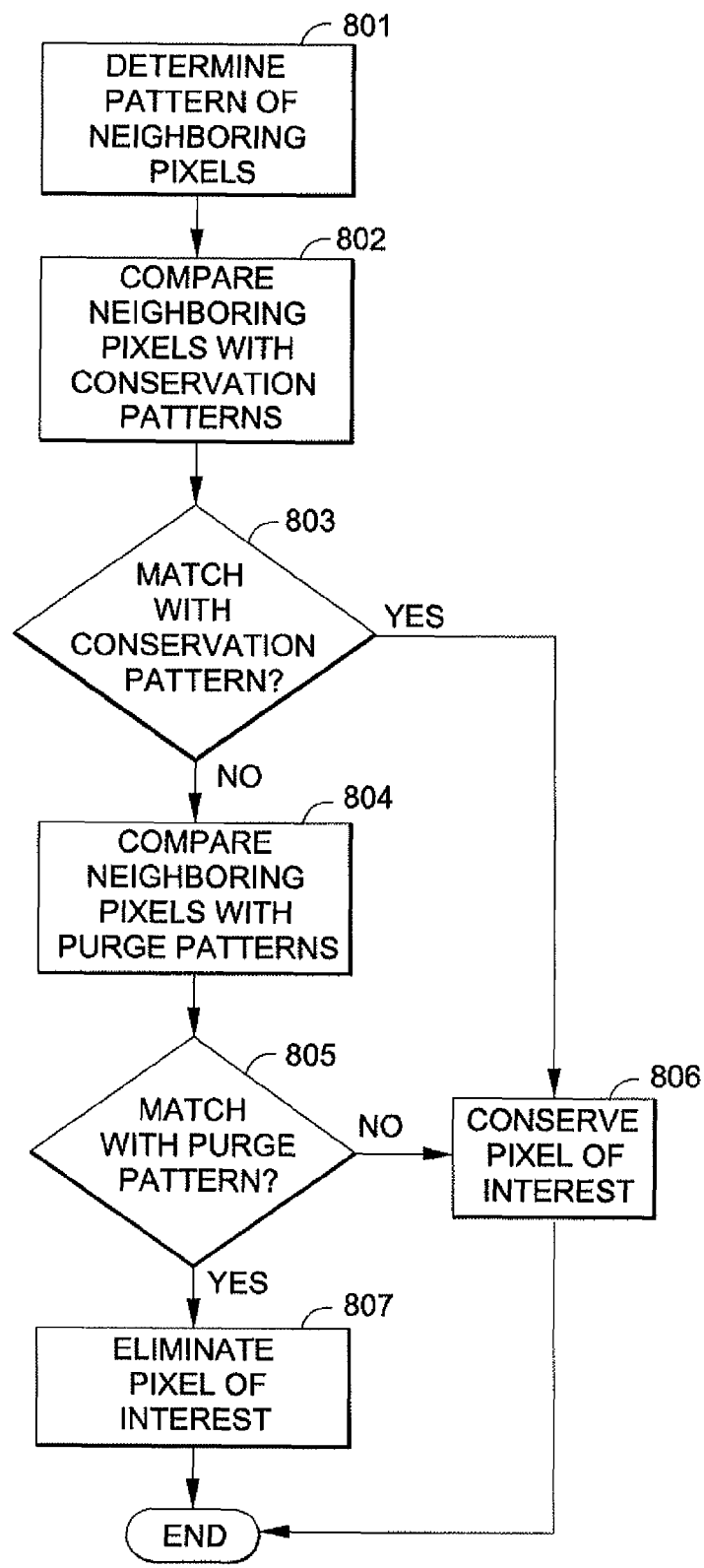
FIG. 8 is a flowchart illustrating another example process for thinning pixels.

FIG. 8 is a flowchart illustrating another example process for thinning pixels. The process of FIG. 8 is applied to each pixel in the input image independently, and to all pixels at once in parallel.

Briefly, in FIG. 8, a thinned output image is generated from an input image. Values of pixels surrounding a pixel of interest in the input image are determined, and first and second neighboring pixel patterns surrounding the pixel of interest are established based on the values of the pixels surrounding the pixel of interest. The second neighboring pixel pattern is compared to each of a set of conservation patterns comprising predefined arrangements of pixel values. If the second neighboring pixel pattern does not match any of the conservation patterns, the first neighboring pixel pattern is compared to each of a set of purge patterns comprising predefined arrangements of pixel values. The pixel of interest is eliminated if the first neighboring pixel pattern matches any of the purge patterns. The comparisons to the conservation patterns and to the purge patterns are performed for each pixel independently, and in parallel for all pixels of the input image.

In step 801, computer 100 determines a pattern of values of neighboring pixels surrounding a pixel of interest. Thus, referring to FIG. 3, computer 100 would determine the respective values of pixels P1 to P24.

In step 802, the extended neighboring pixels P1 to P24 are compared with a set of conservation patterns. More specifically, since each conservation pattern is a 5×5 grid, the values of all of pixels P1 to P24 are compared to each conservation pattern. Thus, for example, computer 100 compares the respective pixel values of extended neighbors P1 to P24 shown in FIG. 3 to each of the set of conservation patterns shown in FIG. 6.

In step 803, computer 100 determines whether there is a match between the extended neighboring pixels P1 to P24 and any of the conservation patterns. If there is a match, the pixel of interest is conserved, and there is no need to compare to the purge patterns. Thus, the process proceeds to step 806. On the other hand, if pixels P1 to P24 do not match any of the conservation patterns, the process proceeds to step 804.

In step 804, the immediately neighboring pixels P1 to P8 are compared with a set of purge patterns. Specifically, since each purge pattern is only a 3×3 grid, only the immediately neighboring pixels P1 to P8 are compared to the purge patterns. Thus, for example, computer 100 compares the pattern of values of pixels P1 to P8 shown in FIG. 3 to each of the patterns shown in FIG. 5.

In step 805, computer 100 determines whether immediately neighboring pixels P1 to P8 match any of the purge patterns. If there is no match with any of the purge patterns, the process proceeds to step 806. On the other hand, if there is a match with one of the purge patterns, the process proceeds to step 807.

In step 806, the pixel of interest is conserved.

In step 807, the pixel of interest is eliminated. As discussed above, this involves changing the value of the pixel of interest so that the pixel of interest matches the background of the output image.

Thus, in contrast to the process of FIG. 7, the process of FIG. 8 compares the neighboring pixels to the conservation patterns first. Since the conservation patterns have higher priority and effectively override the purge decision, any match with a conservation pattern makes comparison to the purge patterns unnecessary. Thus, the process of FIG. 8 may further reduce the time and resources required for the thinning process, since for at least some pixels, the comparison to the purge patterns may not be performed at all.

Moreover, in the process of FIG. 8, there is no need to flag or unflag pixels of interest as candidates for elimination. Specifically, since pixels P1 to P8 are only compared to the purge patterns after pixels P1 to P24 have already been determined not to match any of the conservation patterns, a match with a purge pattern means that the pixel of interest can simply be eliminated.

Several methods are possible for implementing the above thinning process, and in particular for implementing the comparisons between neighboring pixels (e.g., P1 to P8 or P1 to P24) and the purge or conservation patterns. Accordingly, example methods of implementing the purge and conservation comparisons will now be described with respect to FIGS. 9 and 10, respectively.

Figures 9, 10:
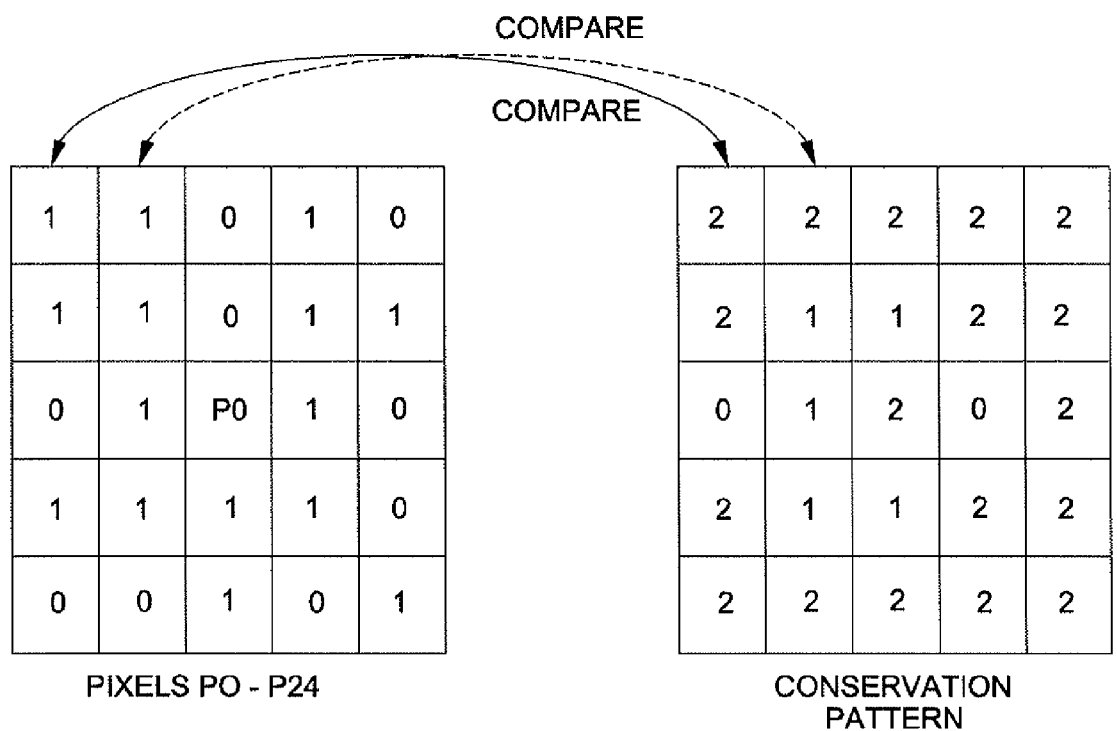
FIG. 9 illustrates examples of weights assigned to pixel positions.
FIG. 10 illustrates an example method of comparing neighboring pixels to conservation patterns.

FIG. 9 is another illustration of the pixel pattern of FIG. 3, in which weights have been assigned to some of the pixel positions. For example, comparing FIGS. 3 and 9, it can be seen that pixel position P1 has a weight of 1, and that pixel position P7 has a weight of 40.

In one implementation, these weights are used to compare a pixel of interest's immediate neighbors P1 to P8 with each of the purge patterns.

In particular, in this implementation, a total sum of weights for a pixel of interest's immediate neighbors P1 to P8 is initialized to zero. Each pixel position of the neighboring pixels P1 to P8 is assigned a weight as shown above, and for each pixel position which includes a significant bit (i.e., whose pixel value is "1"), the corresponding weight is added to the sum of weights.

Thus, for example, if the data pattern of the immediately neighboring pixels looks like FIG. 4, the weights corresponding to pixel positions P1, P2, P3, P4, P6, P7 and P8 would be added to the sum of weights, since each of these positions includes a significant bit (i.e., a pixel value of "1"). Referring back to the weights in FIG. 9, the sum of weights for pixel positions P1, P2, P3, P4, P6, P7 and P8, in hexadecimal representation, would be 1+2+4+8+20+40+80=EF (Hex)= 239 (Decimal). The weights are shown in FIG. 9 in a hexadecimal representation, but other number representations could of course be used.

The purge patterns can be weighted and summed in the same manner. In particular, and referring to the purge patterns shown in FIGS. 5A and 5B, it can be seen that each of the purge patterns has positions which correspond the pixel of interest's immediate neighbors P1 to P8. Thus, weights can be assigned to each of the purge patterns using the same weighting scheme as for pixels P1 to P8, and the weights can be summed in the same manner. Thus, for example, the first purge pattern shown in FIG. 5A has significant bits at positions P1, P2, P3, P4, P6, P7 and P8. Using the same weighting scheme as in FIG. 9, the total weight corresponding to the purge pattern would be 1+2+4+8+20+40+80=EF (Hex)=239 (Decimal). Naturally, the total sum of weights for pixels P1 to P7 in FIG. 3 and the first purge pattern in FIG. 5A should be equal, since the respective pixel value patterns are identical.

Thus, a match can be detected with a purge pattern simply by comparing the total sum of weights of the pixel of interest's immediate neighbors P1 to P8 with the total weight of each purge pattern. In other words, each purge pattern is assigned a total weight based on the positions of significant bits included in the purge pattern, and the sum of weights for the neighboring pixels is compared to the sum of weights for each purge pattern to determine whether the neighboring pixel pattern matches any of the purge patterns. If the total sums of weights match, the patterns match.

This method lends itself to a simple implementation in memory, namely, an array. Specifically, the respective total sum of weights of each purge pattern can be used to populate an array, the neighboring pixels can be compared to the purge patterns is performed by searching the array position corresponding to the sum of weights for the neighboring pixels. For example, a "1" could be stored at each position in an array which corresponds to the total sum weight of a purge pattern. Thus, in this example, a "1" would be stored at Array[EF] (or Array[239]), since there is a purge pattern with a total sum of weights EF (239).

During comparison to the purge patterns, then, a match could easily be detected by computing the total weight of the pixel of interest's immediate neighbors P1 to P8, and then searching the array to see if there is a "1" at the array position corresponding to that total weight. For example, if the total weight of pixels P1 to P8 is 50, the comparison to the purge patterns is performed simply by determining whether there is a "1" at Array[50]. If not, the pattern of pixels P1 to P8 does not match any of the purge patterns.

Of course, other methods of implementing the above comparison are possible, and the disclosure is not limited to the method described above.

FIG. 10 illustrates a method for comparing the pixel of interest's extended neighbors P1 to P24 to a conservation pattern. While the comparison of pixel positions P1 to P24 could be accomplished using the weighting method described above, due to the presence of insignificant positions and the exponential increase in the weights themselves with each additional pixel position, the array required to store the results could end up being too large for real-time processing. Therefore, a different method for comparing to the conservation patterns will be described with respect to FIG. 10.

FIG. 10 is another illustration of the pixel pattern of FIG. 3, wherein binary values "0" and "1" have been filled in at the pixel positions P1 to P24. Thus, rather than depicting the data pattern of pixels P1 to P24 graphically, FIG. 10 depicts the actual binarized values for the data at each pixel position.

Similarly, FIG. 10 also shows an example of a conservation pattern, wherein data values "0", "1" and "2" are shown. In this regard, the value "2" refers to an insignificant position. As mentioned above, the positions in the conservation patterns with a data value of "2" are insignificant or ignored positions. In other words, the value of data at certain positions in the conservation patterns is irrelevant to whether to conserve the pixel, i.e., it does not matter whether the pixel is black or white (or another color). Thus, at these positions, it does not matter what the data value is in the corresponding position of P1 to P24.

In this implementation, pixels P1 to P24 are compared to each conservation pattern by simply traversing each position P1 to P24 of the neighboring pixels and the corresponding positions in the conservation patterns, and determining whether the values at significant corresponding positions match. More specifically, the system simply compares the data value at position P1 to the data value at the corresponding position in each conservation pattern, then checks the data value at position P2 to the data value at the corresponding position in each conservation pattern, and so on.

Since there are relatively few conservation patterns, the computational complexity required to check all of the conservation patterns remains acceptable, even though each conservation pattern is being traversed position by position.

By virtue of the above-described arrangements, many of the disadvantages of current thinning procedures can be reduced. In particular, since the outcome for each pixel is not dependent on the outcome of other pixels, the resultant thinned image can ordinarily be produced much more quickly than in iterative procedures. In addition, the need for pre- or post-processing of the image data is reduced. Moreover, the conservation patterns help to maintain connectivity of the output image.

Figure 11A:
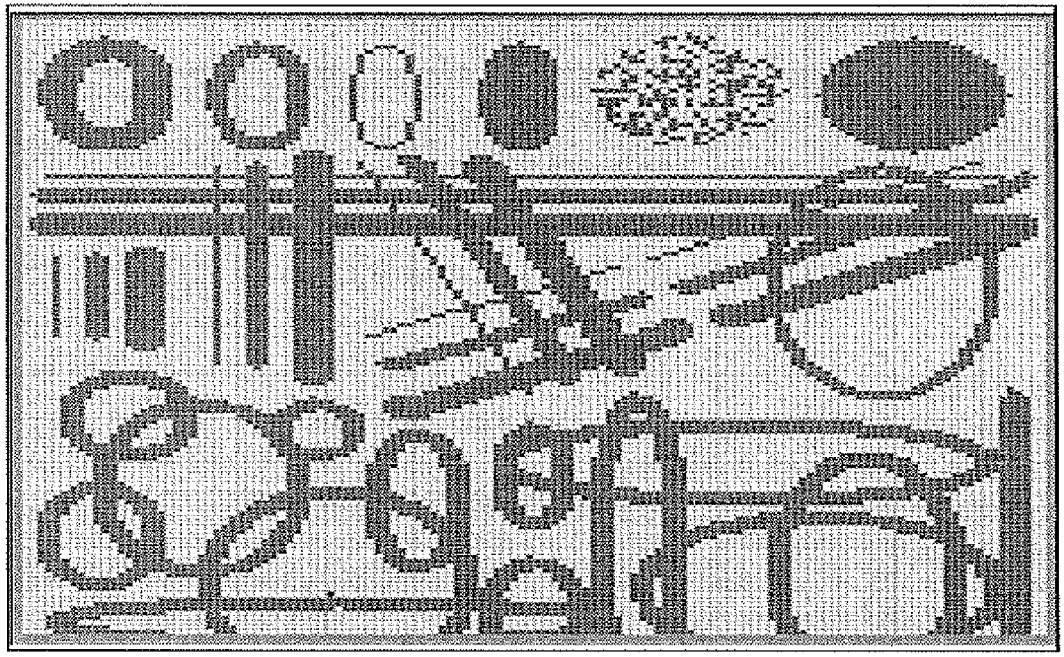
FIGS. 11A and 11B illustrate an example image before and after the thinning process.
Figure 11B:
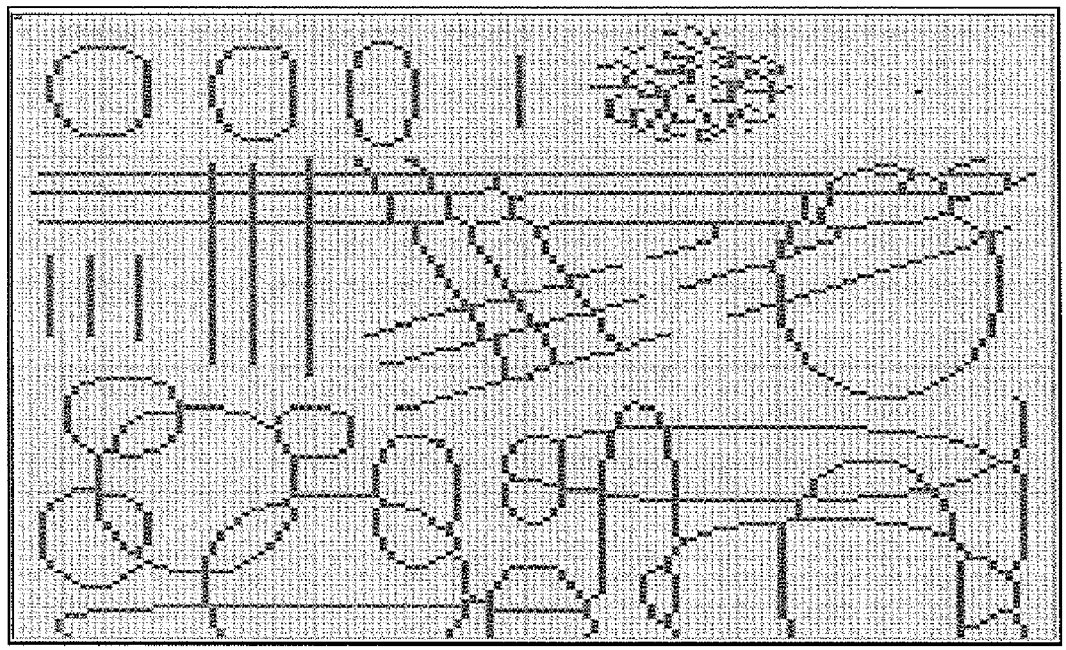

FIGS. 11 to 13 illustrate examples of images before and after the thinning process. FIGS. 11A and 11B illustrate a 256×256, 16-bit depth pixel pattern before and after the thinning process, respectively. FIGS. 12A and 12B illustrate a 10×6 pixel pattern (within the single-pixel outer border) before and after the thinning process, respectively. FIGS. 13A and 13B illustrate a 9×5 pixel pattern (within the single-pixel outer border) before and after the thinning process, respectively.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method of generating a thinned output image from an input digital image, comprising:
   determining values of pixels surrounding a pixel of interest in the input image;
   establishing first and second neighboring pixel patterns surrounding the pixel of interest based on the values of the pixels surrounding the pixel of interest;
   comparing the first neighboring pixel pattern to each of a set of purge patterns comprising predefined arrangements of pixel values, wherein if the first neighboring pixel pattern matches one of the purge patterns, the pixel of interest is flagged for elimination;
   comparing, in the case that the pixel is flagged for elimination, the second neighboring pixel pattern to each of a set of conservation patterns comprising predefined arrangements of pixel values, wherein if the second neighboring pixel pattern matches one of the conservation patterns, the pixel of interest is unflagged, and is thereby saved from elimination; and
   eliminating the pixel of interest if the pixel of interest is still flagged for elimination after comparison to the conservation patterns,
   wherein the comparisons to the purge and conservation patterns are performed for each pixel independently, and in parallel for all pixels of the input image.

2. The method according to claim 1, wherein a 3×3 pattern of neighboring pixels is selected as the first neighboring pixel pattern, and wherein a 5×5 pattern of neighboring pixels is selected as the second neighboring pixel pattern.

3. The method according to claim 1, wherein the set of purge patterns are changed based on directional priority chosen prior to starting a thinning process.

4. The method according to claim 1, wherein the eliminating step includes changing the pixel of interest to a background color so as to eliminate the pixel of interest from the output image.

5. The method according to claim 1, wherein the conservation patterns include insignificant pixel positions where it is irrelevant whether the pixel values match at those positions.

6. The method according to claim 1, wherein during the comparison to the purge patterns, each pixel position of the first neighboring pixel pattern is assigned a weight, and for each pixel position which includes a significant bit, the corresponding weight is added to a sum of weights for the first neighboring pixel pattern.

7. The method according to claim 6, wherein each purge pattern is assigned a total weight based on the positions of significant bits included in the purge pattern, and wherein the sum of weights for the first neighboring pixel pattern is compared to the sum of weights for each purge pattern to determine whether the first neighboring pixel pattern matches any of the purge patterns.

8. The method according to claim 7, wherein the respective sums of weights for each purge pattern are used to populate an array, and comparing the first neighboring pixel pattern to the purge patterns is performed by searching the array position corresponding to the sum of weights for the first neighboring pixel pattern.

9. The method according to claim 1, wherein comparison to the conservation patterns includes traversing each position of the second neighboring pixel pattern and corresponding positions in the conservation patterns, and determining whether the values at significant corresponding positions match.

10. A method for generating a thinned output image from an input image, comprising:
   determining values of pixels surrounding a pixel of interest in the input image;
   establishing first and second neighboring pixel patterns surrounding the pixel of interest based on the values of the pixels surrounding the pixel of interest;
   comparing the second neighboring pixel pattern to each of a set of conservation patterns comprising predefined arrangements of pixel values, wherein if the second neighboring pixel pattern does not match any of the conservation patterns, the first neighboring pixel pattern is compared to each of a set of purge patterns comprising predefined arrangements of pixel values, and
   eliminating the pixel of interest if the first neighboring pixel pattern matches any of the purge patterns,
   wherein the comparisons to the conservation patterns and the comparisons to the purge patterns are performed for each pixel independently, and in parallel for all pixels of the input image.

11. The method according to claim 10, wherein a 3×3 pattern of neighboring pixels is selected as the first neighboring pixel pattern, and wherein a 5×5 pattern of neighboring pixels is selected as the second neighboring pixel pattern.

12. The method according to claim 10, wherein the set of purge patterns can differ based on directional priority chosen prior to starting a thinning process.

13. The method according to claim 10, wherein the eliminating step includes changing the pixel of interest to a background color so as to eliminate the pixel of interest from the output image.

14. The method according to claim 10, wherein the conservation patterns include insignificant pixel positions where it is irrelevant whether the pixel values match at those positions.

15. The method according to claim 10, wherein during the comparison to the purge patterns, each pixel position of the first neighboring pixel pattern is assigned a weight, and for each pixel position which includes a significant bit, the corresponding weight is added to a sum of weights for the first neighboring pixel pattern.

16. The method according to claim 15, wherein each purge pattern is assigned a total weight based on the positions of significant bits included in the purge pattern, and wherein the sum of weights for the first neighboring pixel pattern is compared to the sum of weights for each purge pattern to determine whether the first neighboring pixel pattern matches any of the purge patterns.

17. The method according to claim 16, wherein the respective sums of weights for each purge pattern are used to populate an array, and comparing the first neighboring pixel pattern to the purge patterns is performed by searching the array position corresponding to the sum of weights for the first neighboring pixel pattern.

18. The method according to claim 10, wherein comparison to the conservation patterns includes traversing each position of the second neighboring pixel pattern and corresponding positions in the conservation patterns, and determining whether the values at significant corresponding positions match.

19. A non-transitory computer-readable storage medium on which is stored a computer program that, when executed by a computer system, performs the method of claim 1.

20. A non-transitory computer-readable storage medium on which is stored a computer program that, when executed by a computer system, performs the method of claim 10.

21. An apparatus which comprises at least one processor and a memory, wherein the processor executes steps stored in the memory to perform the method of claim 1.

22. An apparatus which comprises at least one processor and a memory, wherein the processor executes steps stored in the memory to perform the method of claim 10.

* * * * *